Figure 1:
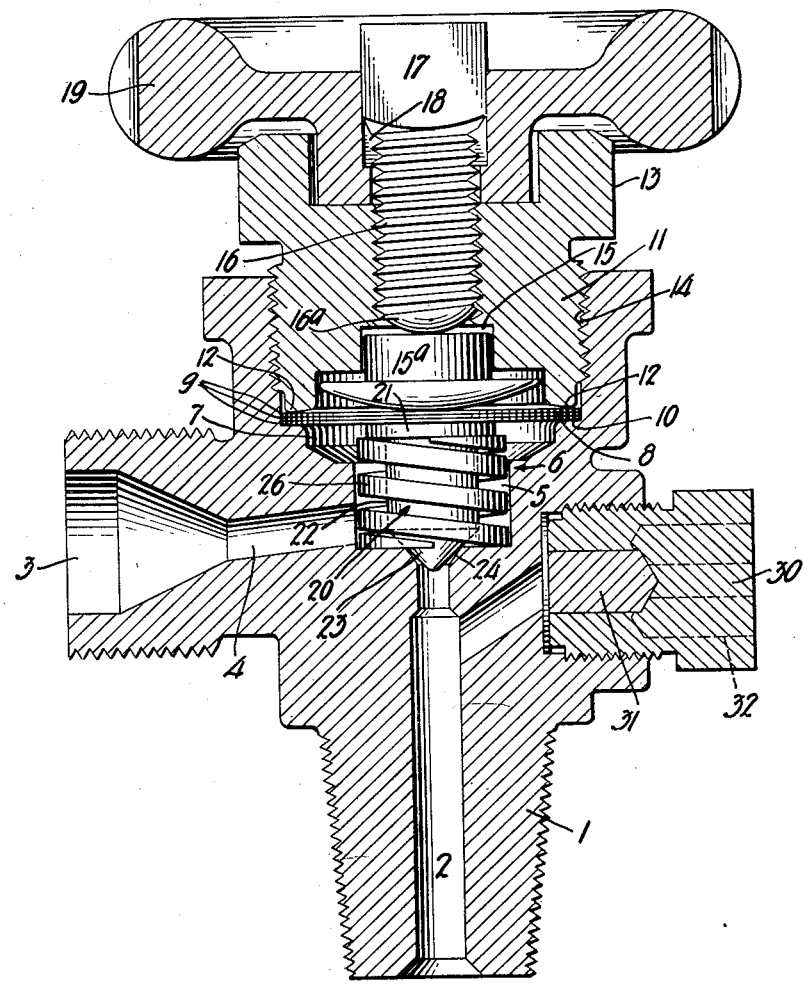

March 11, 1930.  W. F. McKAY  1,749,774

VALVE

Filed Sept. 19, 1928

INVENTOR
William F. McKay.
BY
ATTORNEY

Patented Mar. 11, 1930

1,749,774

UNITED STATES PATENT OFFICE

WILLIAM F. McKAY, OF NEWARK, NEW JERSEY, ASSIGNOR TO INTERNATIONAL OXYGEN COMPANY, A CORPORATION OF NEW JERSEY

VALVE

Application filed September 19, 1928. Serial No. 306,822.

My present invention is shown as embodied in a valve primarily designed for charging and discharging oxygen, hydrogen and other high pressure tanks, but it will be obvious that various of its features are applicable for controlling the flow of other fluids. The high pressure gas tank valves of the type to which my present invention applies are characterized by gas-tight diaphragms clamped to annular seats by massive screw plugs, the valve operating means in each case being outside, in operative relation to the outer face of the diaphragm, while the valve element is inside the valve chamber in operative relation to the inner face of the diaphragm. Various features of my present invention are similar to the features of the invention disclosed and claimed in my prior Patent No. 1,485,792, granted March 4th, 1924.

In such constructions it has been common to have a cone element of the valve engaging a valve seat at the end of a passage controlled thereby and a base element engaged by the sealed-in face of the diaphragm. In said prior patent the stem of the movable element is cylindrical in form and fits in a cylindrical or helical spring which practically fits a cylindrical recess or portion of the valve chamber.

The present invention represents an improvement over the patented construction in many respects.

Objects of the invention are to provide a construction in which better centering and guiding of the valve element are obtained; wear on the valve seat is minimized; the danger of cracking the diaphragm after repeated use is materially reduced; and slight diaphragm flexure affords relatively wide opening of the valve. The present invention also prevents "freezing" or "welding" of any of the movable parts to associated stationary or movable parts, due to rusting or to the sustained high pressures employed.

In carrying out the invention, I preferably use for the spring a rust-proof metal such, for instance, as bronze wire. Preferably the wire is of rectangular cross-section and comprises a flat-ended coil having few convolutions. Such a coil affords substantially flat ends seating respectively in the bottom of the recess in the valve chamber and against the head of the valve. The possibility of the valve tilting off-center is thus minimized and due to the few convolutions circumferential distortion of the wire spring under compression is slight, and very little clearance need be left between the spring and the walls of the recess in which it is accommodated. Incidentally the flat faces of the spring coil serve as more effective guiding means for and more closely fit the valve which works through them.

The use of the few convolutions in a relatively massive wire coil also permits the freer escape of gases through and around the coil convolutions when the valve is unseated. Preferably the conical end of this valve is relatively blunt as opposed to the sharply tapered valve disclosed in the prior patent above referred to. Thus slight axial movement of the valve opens a relatively wide annulus through which gas may pass.

In accordance with conventional practice, as exemplified by my prior patent, that portion of the operating mechanism which is in immediate contact with the outside of the diaphragm provides a relatively sharp annular diaphragm-engaging portion about which the diaphragm flexes. Cracking in the region of this annular diaphragm pusher element is consequently likely to occur. With my present construction, the face of the diaphragm-engaging element has its most advanced point at its center and is preferably convex, curving rearwardly in all directions from the center. No sharp edges engage the diaphragm and the diaphragm is free to flex along more or less natural lines throughout its entire area, as opposed to being bent sharply along a predetermined annular line at each flexion. Even when the diaphragm is forced rearwardly by the spring as the convex diaphragm engaging member is moved rearwardly a dimple or concave spot at the center of the diaphragm is maintained whereby the return of the diaphragm to normal position or beyond may be readily accomplished without bruising, sharply bending or cracking the diaphragm.

Figure 2:
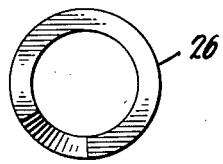

The above and other features of my invention may be more fully understood from the following description in connection with the accompanying drawing, in which Figure 1 is characteristic longitudinal axial section of the valve plug with the operative parts in place therein; and Figure 2 is a view of one end of my improved spring.

As shown in Figure 1, the valve plug has a screw threaded portion 1 adapted to serve as a closure for a compressed gas tank, and the body of the plug is formed with an axial passage 2 communicating with the gas tank at its lower end and at its upper end communicating with the exterior outlet 3, 4 through a cylindrical cavity 5 forming a valve chamber 6 having an enlarged upper portion 7 substantially circular in cross section and connected with the first mentioned cylindrical section by a suitable tapered portion. The upper portion 7 of the valve chamber is closed at the top by a diaphragm 8 which may be made up of a plurality of thin disks 9 resting on a ledge 10, although a washer may be interposed if desired.

This diaphragm is clamped against this ledge 10 by means of a screw plug 11 having a clamping annulus 12 with rounded edges and which may be screwed down as tightly as may be desired, but having the exterior at 13 formed with a nut, or other suitable formation for application of a spanner or similar tool.

Shoulder 8 at its inner edge is tapered downwardly and clamping annulus 12 is beveled upwardly from its outer to its inner edge, in order that there may be no bending of the diaphragm along sharply defined lines adjacent its edge.

The exterior of this clamping plug has a screw thread 14 engaging a screw threaded barrel of the main valve body. The interior of the plug is formed as shown, with a cylindrical recess 15, in which slides the shank of a thrust member 15$^a$ having a downwardly facing convex foot portion normally resting upon the diaphragm and which is adapted to be forced against the same by means of a screw 16 which has a square head 17 engaged in a square recess 18 in the hand wheel member 19 and a rounded lower end 16$^a$ which engages the upper end of the shank of the thrust member.

The valve member or element 20 comprises a flat flange-like head 21, a relatively large diameter cylindrical shank 22, and a relatively blunt cone or needle 23 which is adapted to engage a seat 24 at the upper end of the vertical passage 2.

Arranged in the well 5 is a flat-ended helical spring 26. Preferably this spring, as well as the valve member itself, is of rustproof material such, for instance, as bronze. The spring is relatively massive, being of square cross-section and preferably having comparatively few convolutions. Due to the few convolutions employed, circumferential distortion of the spring under compression is comparatively slight and the spring may therefore fit the walls of the well 5 and also the cylindrical shank 20 of the valve member more accurately than has been heretofore possible. Moreover, the spring provides relatively wide, flat guiding surfaces both exteriorly and interiorly; the flat ends of the spring afford wide substantial bearing faces against the bottom of the well and the head of the valve, and the space between the spring convolutions is adequate to permit substantially free flow of gases from the passage 2 when the blunt-nosed valve member is raised from its seat. The bluntness of the conical end of this valve is an important feature in that it permits the opening of a relatively wide annulus for the escape of gases upon relatively slight axial movement of the valve. The method of assembly and operation of the above will be obvious from the foregoing. The valve and spring are assembled within recess or cavity 5; diaphragm 8 is applied; block or thrust member 15$^a$ is positioned with its shank in recess 15 and the clamping plug 11 screwed down upon the diaphragm as tightly as may be desired. Then the valve-operating screw 16 is inserted with its head engaging the recess 18 as shown. Then rotating the hand wheel 19 in one direction operates to seat the valve as powerfully as required while reverse rotation will release the valve and the powerful spring 26 will thrust the valve and the diaphragm upwardly flexing the latter above its normal position as permitted by release of the clamping pressure acting through 15$^a$.

It will be noted that the pressure applying end 15$^b$ of the thrust member 15$^a$ has its most advanced point at the center and tapers rearwardly in all directions from the center, this member being preferably of spherical convexity. By virtue of this arrangement the member 15$^b$ presents no sharp surfaces which might serve as sharp bending mandrels for the diaphragm. In consequence upon repeated flexure of the diaphragm there is little danger of the diaphragm cracking, since no strains are developed therein by repeated backward and forward bending about a sharp corner or about a sharp annular bending line as in the prior patent. The bending of the diaphragm is always gradual and substantially the full diaphragm area is available for the purpose of flexure.

Member 15$^b$ serves in effect as a convex mandrel which guides the bending of the diaphragm and which is always in snug contact therewith. Even when the diaphragm is flexed upwardly to a substantially extreme position the center of the convex member 15ᵇ will still rest in a slight depression in the center of the diaphragm.

It will be noted that in this operation the broad head 21 of the valve member engaging the diaphragm 8 on one side and being engaged by the plane end of the spring 26 at the opposite side is operated to parallel the axis of the valve with the axis of the valve seat while the slight lateral play of the guiding spring will permit such very slight lateral shift of the valve element as may be necessary to bring the axes into exact coincidence and the valve into perfect fit upon its seat.

30 is a relief plug of well-known type containing relatively soft metal 31 adapted to blow through passage 32 in case of too great abnormal pressure, as, for instance, in case of fire or other conditions operating to overheat the tanks.

I claim:

1. A valve having a valve chamber comprising a cylindrical portion having an inlet opening at one end and an outlet opening at one side adjacent said end, and a portion of greater diameter at the end of the chamber farthest from the inlet opening; an imperforate diaphragm closing the large end of said chamber; a valve element including a stem, a relatively blunt cone portion engaging in the inlet opening and a broad base portion abutting against but unattached to said diaphragm; and means for centering and retracting said valve element including a flat ended helical spring, of rectangular cross-section, the interior of which approximately fits over the valve stem and the exterior of which approximately fits said cylindrical portion having the inlet and outlet openings, in combination with means for operating the valve element including external means for forcing the diaphragm inward against the pressure of said spring.

2. A valve having a valve chamber comprising a cylindrical portion having an inlet opening at one end and an outlet at the side adjacent said end and a portion of greater cross section at the end of the chamber opposite the inlet opening; an imperforate diaphragm formed of at least one ply of sheet metal and closing the large end of said chamber; a valve element including a stem, a portion adapted to close the inlet opening and a broad base portion abutting against but unattached to said diaphragm; means for centering and retracting said valve element including a helical spring enclosing said valve stem and being formed of spring wire or rod material of square cross-section and tapered at the ends to present flat end surfaces for the spring, the interior of the spring approximately fitting the valve stem and the exterior of the spring approximately fitting said cylindrical portion of the valve chamber; and means for operating the valve element including external means for forcing the diaphragm inwardly against the pressure of said spring.

Signed at Newark in the county of Essex and State of New Jersey.

WILLIAM F. McKAY.